United States Patent Office 3,740,395
Patented June 19, 1973

3,740,395
ETHYL 10 - (β-MORPHOLYLPROPIONYL)-PHEN-
THIAZINE-2-CARBAMATE HYDROCHLORIDE
Anna Nikitichna Gritsenko, Volokolamskoe shosse 80,
kv. 28; Jury Ivanovich Vikhlyaev, Dorogomilovskaya
ulitsa 6/8, kv. 12; Semen Vladimirovich Zhuravlev,
Minsskaya ploschad 3/8, kv. 38; Natalya Veniami-
novna Kaverina, Novopeschanaya ulitsa 3, kv. 32;
Zlata Petrovna Senova, Mytnaya ulitsa 23, korpus 2,
kv. 67; and Olga Vasilievna Ulyanova, 2 ulitsa
Oktyabrskogo Polya 21, kv. 46, all of Moscow, U.S.S.R.
No Drawing. Filed Oct. 14, 1969, Ser. No. 870,444
Int. Cl. C07d 93/14
U.S. Cl. 260—243 AC                          1 Claim

ABSTRACT OF THE DISCLOSURE

A novel composition of matter, ethyl 10-(β-morpholyl-
propionyl)-phenthiazine-2-carbamate hydrochloride, hav-
ing the formula

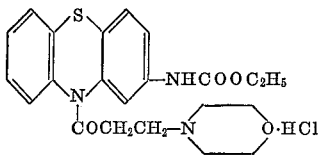

which comprises reacting ethyl phenthiazine-2-carbamate
with β-chloropropionyl chloride in an inert organic solvent
at a boiling point of the solvent used, condensing the re-
sulting ethyl 10-(β - chloropropionyl) - phenthiazine - 2-
carbamate with morpholine in an inert organic solvent,
treating the ethyl 10 - (β - morpholylpropionyl)-phen-
thiazine-2-carbamate with hydrogen chloride, and separat-
ing the target compound.

The novel compound, ethyl 10-(β-morpholylpro-
pionyl)-phenthiazine-2-carbamate hydrochloride, is the
active principle of an antiarhythmic pharmaceutical
preparation.

---

This invention relates to a novel composition of matter,
ethyl 10-(β-morpholylpropionyl) - phenthiazine-2-carba-
mate hydrochloride, and to the application of and a
method for preparing the same.

This novel composition of matter is represented by the
formula

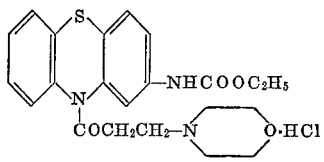

The compound of the invention is a yellowish powder
which is soluble in water and alcohol; M.P. 188–189° C.
(decomp.).

Ethyl 10-(β-morpholylpropionyl)-phenthiazine-2-carba-
mate hydrochloride is prepared, by reacting ethyl phen-
thiazine-2-carbamate and β-chloropropionyl chloride in
an inert solvent, the process being conducted at the boiling
point of the solvent used. The resulting ethyl 10-(β-
chloropropionyl)-phenthiazine - 2 - carbamate is further
reacted with morpholine in an inert organic solvent, fol-
lowed by treating the ethyl 10-(β-morpholylpropionyl)-
phenthiazine-2-carbamate with hydrogen chloride, and
separating the desired compound.

It is preferable to use benzene or homologues thereof,
or chloroform or dichloroethane as the organic solvent.

The present method for preparing ethyl 10-(β-
morpholylpropionyl)-phenthiazine-2 - carbamate hydro-
chloride is accomplished as follows.

Ethyl phenthiazine-2-carbamate is dissolved in an inert
organic solvent, preferably in benzene or homologues
thereof, chloroform, or dichloroethane, followed by add-
ing to the solution β-chloropropionyl chloride, warming
the reaction mixture to the boiling point of the solvent
used and maintaining it at this temperature for a period
of 3–6 hours.

The reaction mixture is clarified with activated carbon
and cooled to room temperature, thereby causing ethyl
10-(β-chloropropionyl)-phenthiazine-2-carbamate to pre-
cipitate. The yield of this compound equals 65–70% of
the theoretical amount; M.P. 169–170° C.

The ethyl 10-(β - chloropropionyl) - phenthiazine-2-
carbamate is dissolved in an organic solvent inert to the
reactants, and morpholine is added to the solution.

To accelerate the process, the reaction mixture is heated
to a temperature of 60–120° C., followed by separating
the morpholine hydrochloride formed, acidulating the
solution with hydrochloric acid, clarifying the solution
with activated carbon and making it alkaline to obtain
the free base, viz, ethyl 10-(β-morpholylpropionyl)-
phenthiazine-2-carbamate, which is extracted with an
organic solvent and treated with hydrogen chloride gas.
The resulting ethyl 10-(β-morpholylpropionyl)phen-
thiazine-2-carbamate hydrochloride is obtained in a yield
of 70–75% of the theoretical amount.

The process of preparing ethyl 10-(β-morpholylpro-
pionyl)-phenthiazine-2-carbamate hydrochloride may be
realized without separating the intermediate product, ethyl
10-(β-chloropropionyl)-phenthiazine-2-carbamate. In this
instance, the reaction mixture after the first process stage
is distilled to remove the organic solvent and excess β-
chloropropionyl chloride, the residue is dissolved in an
inert organic solvent, followed by adding thereto mor-
pholine, and thereafter carrying out the process as de-
scribed hereinabove.

The compound of the invention, ethyl 10-β-morpholyl-
propionyl phenthiazine-2-carbamate hydrochloride has
been found to possess physiological activity which warrants
its application as the active principle of a pharmaceutical
preparation. The pharmaceutical preparation, designated
hereinafter as Ethmozin, is useful for treating arhythmia
and contains ethyl 10 - (β - morpholylpropionyl)-phen-
thiazine-2-carbamate hydrochloride as the active principle.

Ethmozin is noted for its pronounced antiarhythmic
action and may, be used for treating arthythmic
phenomena associated with disturbances of heart muscle
conduction, e.g., diverse extrasystoles, paroxysmal tachy-
cardia, and also paroxysms of auricular fibrillation.

Ethmozin is superior to the known antiarhythmic drugs,
such as Quinidine and Novocainamide in that it exhibits
a broader spectrum of therapeutic action and is devoid
of toxic effects. Moreover, Quinidine and Novocainamide
depress all heart functions, viz automatism, excitability,
conduction, and contractability. Clinical experiments are
indicative of the fact that Ethmozin, even when admin-
istered intravenously, depresses but little the heart muscle
conduction and exerts no effect on heart contractability.

The pharmaceutical preparation, according to the invention, contains the active principle in combination with a filler, when used in tablets, or a diluent when intended for injections.

The effect of Ethmozin has been tested clincally on 298 patients suffering from various forms of cardiac rhythm disturbances of diverse ethiology. The rhythm disturbances manifested themselves, for the most part, in sinus tachycardia, various forms of extrasystole, paroxysmal tachycardia attacks, auricular fibrillation attacks, permanent fibrillar arhythmia, and also composite forms of arhythmia.

Clinical studies have shown Ethmozin to be particularly effective for treating such forms of cardiac rhythm disturbances as extrasystole, paroxysmal tachycardia and auricular fibrillation attacks caused by various diseases, e.g. atherosclerotic coronary cardiosclerosis, myocardial infraction, essential hypertension, thyrotoxicosis, and neurovegetative dystonia. The forms of arhythmia of rheumatic origin are somewhat less susceptible to treatment with Ethmozin.

Ethmozin is administered orally in the form of powder or 0.025 g. tablets, or by intramuscular or intravenous injections in the form of solutions containing 2.5 wt. percent of the active principle.

For oral administration, the single dose equals 25 mg. Initially the present drug is given by the mouth three times daily (single dose, a 25 mg. tablet). If the patent shows good tolerance to the drug, as evidenced by the absence of dyspeptic phenomena, the daily dose is increased to 4–6 tablets. Where this increased dose gives no positive effect, and at the same time produces no untoward side effects, the daily dosage may be increased to 8–9 tablets (2 tablets four times daily). The average therapeutic dosage of Ethmozin equals 2–6 tablets daily. Where the administration of maximum doses results in relief, further treatment involves the administration of supporting doses (about ⅔ of the maximum dose). The course of treatment takes at least 7–15 days or, if necessary, as long as up to 4–6 weeks.

The overall dosage of Ethmozin required for the course of treatment is individual and depends upon the particular form of arhythmia.

For intramuscular injections, use is made of a 2.5% solution in ampoules, which is diluted, prior to injection, with a 0.25–0.5% solution of novocaine or with physiological solution.

The intravenous administration of Ethmozin is started with 2 ml. of the 2.5% solution diluted to 10 ml. with physiological solution or a 5% glucose solution.

The preparation is administered intramuscularly slowly for a period of 3–4 min. If the patent's tolerance is good, the single dose may be increased to 4 ml. Ethmozin disdispensed in ampoules is also diluted with physiological solution or a 5% glucose solution to obtain a volume of 10 ml. Intravenous injection is introduced at a slow rate for a period of 4–5 minutes.

The doses of Ethmozin used and the methods of drug administration are seelcted depending upon the form of arhythmia being treated.

Patients' tolerance to Ethmozin is good.

Ethmozin causes but insignificant side effects, only slight pain in the epigastric area and dizziness being observed in selected cases. These side effects disappear on diminishing the dose of the drug and discontinuing the treatment.

Ethmozin is contraindicated when patients suffer from functional disturbances of parenchimatous organs or of heart muscle conduction, or have been previously treated with monoamino oxidase inhibitors. The administration of Ethmozin simultaneously with monoamino oxidase inhibitors is also contraindicated.

Ethmozin should be stored in a dry, dark and cool room together with Venena B.

For a better understanding of the method for preparing ethyl 10 - (β-morpholylpropionyl)-phenthiazine-2-carbamate hydrochloride the following examples are presented by way of illustration.

EXAMPLE 1

To a solution of 10 g. (0.035 mole) of ethyl phenthiazine-2-carbamate in 30 ml. of anhydrous toluene is added dropwise 5.3 g. (0.042 mole) of β-chloropropionyl chloride, and the mixture is refluxed at a temperature of 110–120° C. for a period of 4 hours, followed by clarifying the mixture with activated carbon and cooling it to room temperature.

A precipitate of ethyl 10-(β-chloropropionyl)-phenthiazine-2-carbamate is removed by filtration. The yield is 10.2 g. (77.5% of the theoretical amount); M.P. 169–170° C.

Analysis.—Found (percent): S 8.49; 8.66; Cl 9.45, 9.48. Calcd. for $C_{18}H_{17}ClNO_3S$ (percent): S 8.51; Cl 9.41.

10.2 g. of the ester is dissolved in 50 ml. of toluene, 4.72 g. of morpholine is added thereto, and the mixture is refluxed at 110–120° C. for a period of 3 hours. A precipitate of morpholine hydrochloride is removed by filtration, and the filtrate is washed with water in order to remove excess morpholine, followed by acidulating with dilute hydrochloric acid to adjust the pH of the filtrate at 3. The acidic aqueous layer is separated, clarified by treatment with activated carbon and made alkaline until the pH equals 8–9. This procedure yields the free base of ethyl 10-(β-morpholylpropionyl)-phenthiazine-2-carbamate; M.P. 156–157° C.

Analysis.—Found (percent): S 7.63, 7.68. Calcd. for $C_{22}H_{25}N_3O_4$ (percent): S 7.50.

The free base thus obtained is extracted with toluene, the extract is dried over magnesium sulphate and to the anhydrous toluene solution is aded an anhydrous ethereal solution of hydrogen chloride until the precipitation of the target compound is complete. This procedure yields 9.53 g. (76.2% of the theoretical amount) of ethyl 10-(β-morpholylpropionyl)-phenthiazine-2-carbamate hydrochloride. After recrystallization from dichloroethane, the target compound melts at 189° C. (decomp.).

Analysis.—Found (percent): Cl 7.65, 7.55; S 6.85, 6.95. Calcd for $C_{22}H_{25}N_3O_4SHCl$ (percent): Cl 7.64; S 6.91.

EXAMPLE 2

Ten grams of ethyl phenthiazine-2-carbamate is dissolved in 30 ml. of dichloroethane, and to the solution is added dropwise 5.3 g. of β-chloropropionyl chloride, followed by refluxing the reaction mixture at 85° C. for a period of 5 hours. The subsequent procedure is as disclosed in Example 1, except for the fact that use is made of dichloroethane as the solvent.

The target compound is obtained in a yield of 9 g. (72% of the theoretical amount).

EXAMPLE 3

To 10 g. of ethyl phenthiazine-2-carbamate dissolved in 30 ml. of chloroform is added dropwise 5.3 g. of β-chloropropionyl chloride, and the reaction mixture is refluxed at a temperature of 65° C. for a period of 5 hours. The subsequent procedure is as disclosed in Example 1, except for the fact that use is made of chloroform as the solvent.

The target compound is obtained in a yield of 8.3 g. (70% of the theoretical amount).

We claim:

1. Ethyl 10 - (β - morpholylpropionyl)-phenthiazine-2-carbamate hydrochloride of the formula

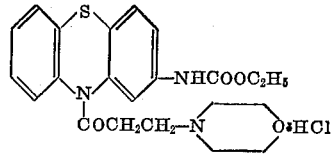

(References on following page)

References Cited

UNITED STATES PATENTS

| | | | |
|---|---|---|---|
| 3,074,939 | 1/1963 | Davis | 260—243 AC |
| 3,410,849 | 11/1968 | Renz et al. | 260—243 AC |

FOREIGN PATENTS

| | | | |
|---|---|---|---|
| 147,184 | 8/1962 | U.S.S.R. | 260—243 AC |

OTHER REFERENCES

Soviet Inventions Illustrated (Chemical) October 1962, sec. 3, p. 2, #147, 184.

Chemical Abstracts Subject Index 1962–1966 (1970), "Phenothiazine-2-Carbamic Acid," p. 16, 976S.

Clinical Report to Soviet Ministry of Health: "Practice of Clinical Application of Ethmozin for Treating Rhythm Disturbances in Cardiac Action," Zaslavskaja et al. (1966–1967).

HENRY R. JILES, Primary Examiner

S. D. WINTERS, Assistant Examiner

U.S. Cl. X.R.

260—243 A; 424—247